United States Patent Office.

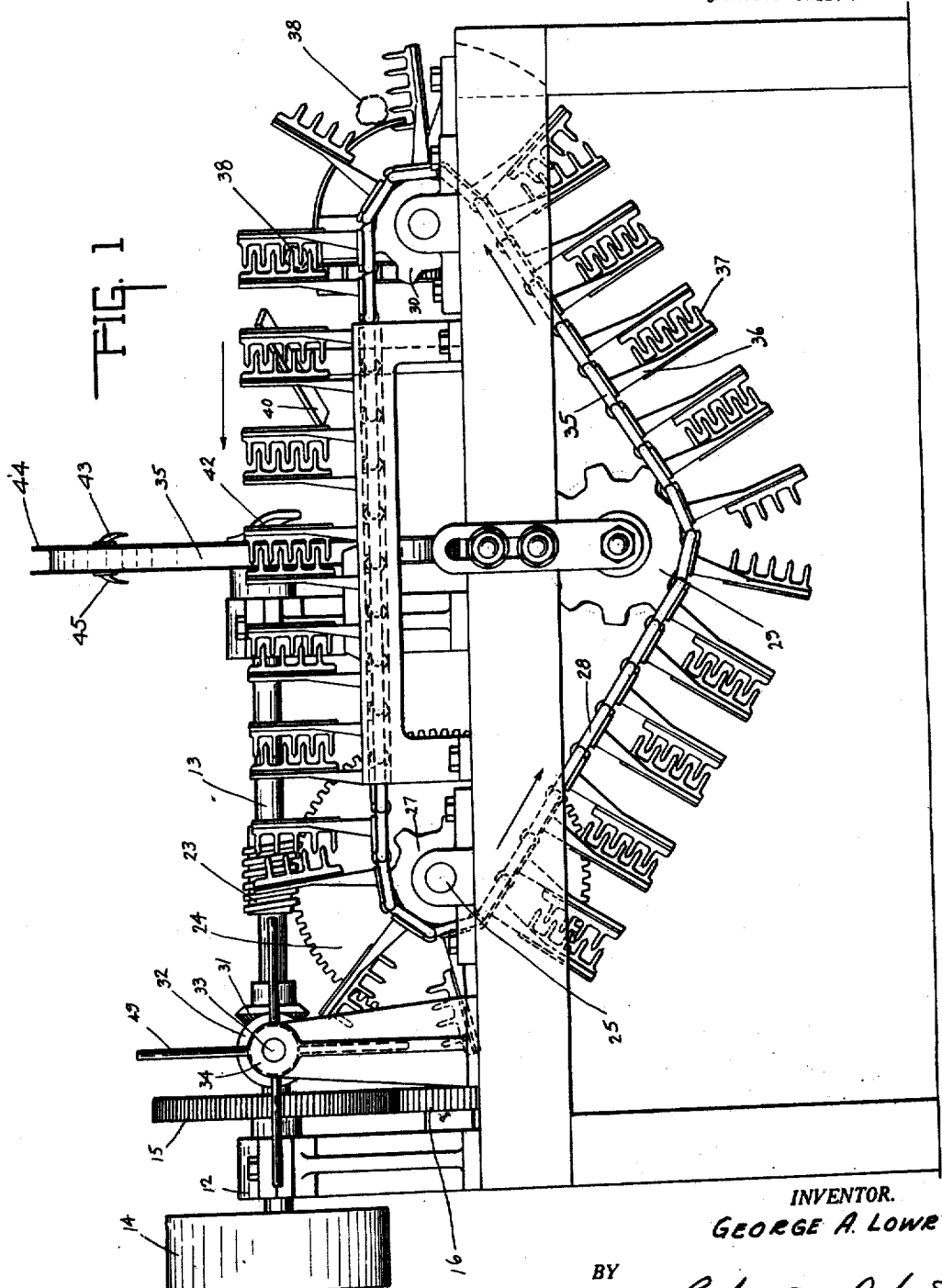

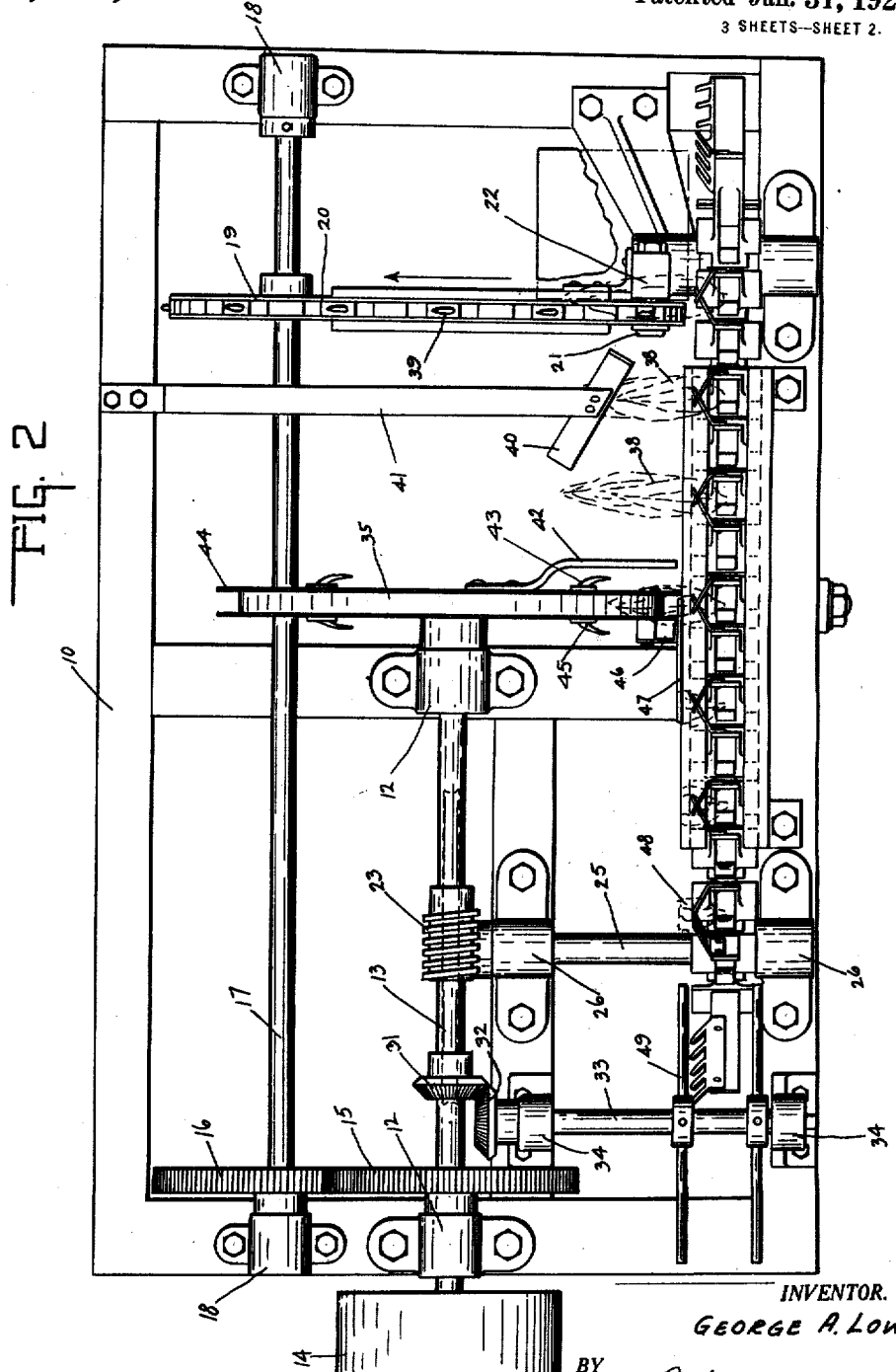

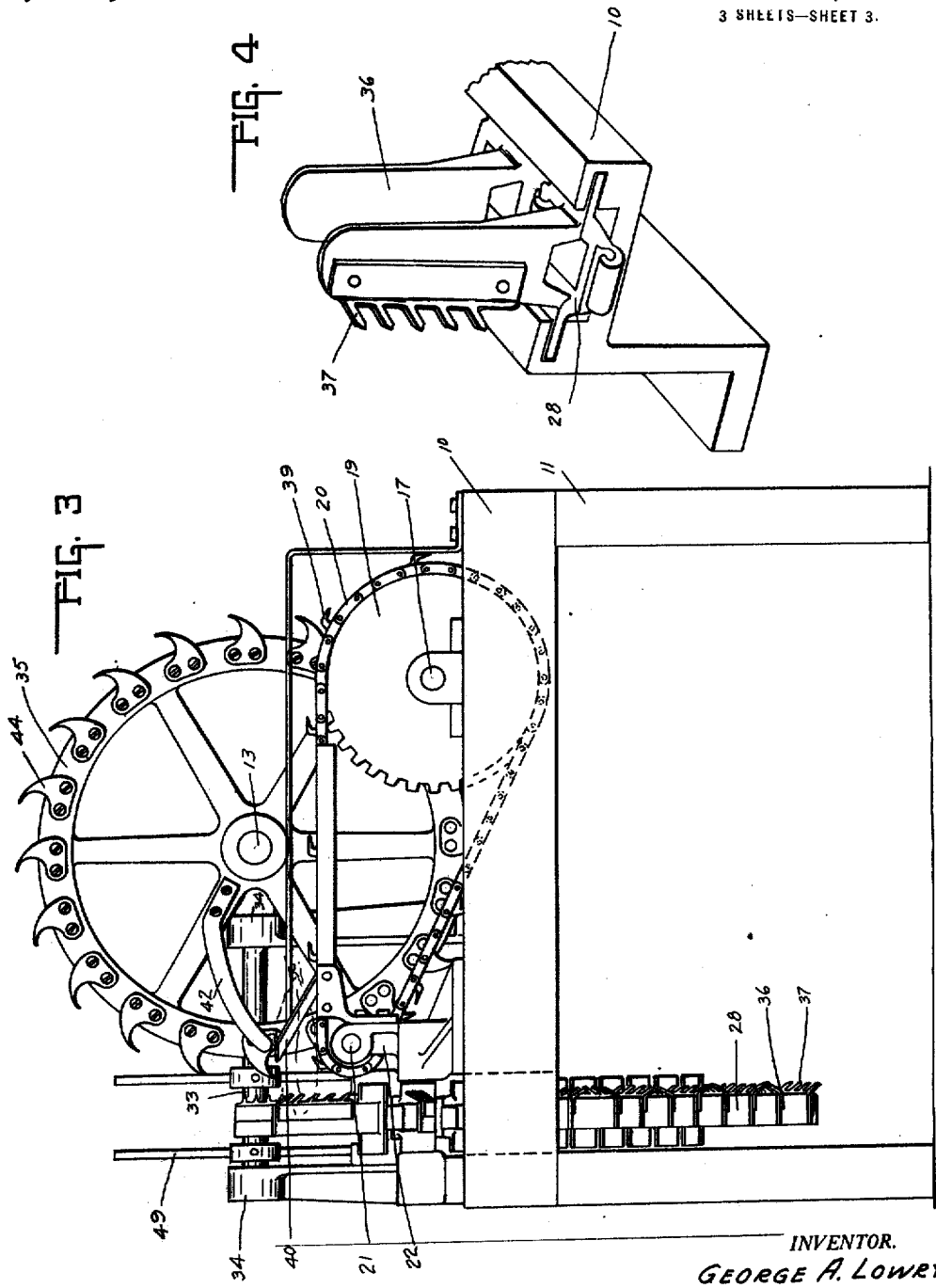

GEORGE A. LOWRY, OF CHICAGO, ILLINOIS, ASSIGNOR OF ONE-HALF TO BERTHA McNALLY LOWRY, OF CHICAGO, ILLINOIS, AND ONE-HALF TO A. BLAIR RIDINGTON, OF ST. LOUIS, MISSOURI.

COMBINED HUSKING AND SHREDDING MACHINE.

1,404,779. Specification of Letters Patent. Patented Jan. 31, 1922.

Application filed September 20, 1920. Serial No. 411,534.

*To all whom it may concern:*

Be it known that I, GEORGE A. LOWRY, a citizen of the United States, and a resident of Chicago, county of Cook, and State of Illinois, have invented a certain new and useful Combined Husking and Shredding Machine; and I do hereby declare that the following is a full, clear, and exact description thereof, reference being had to the accompanying drawings, in which like numerals refer to like parts.

This invention relates to a combination husking and shredding machine for corn, and is particularly adapted for use in canning factories, and on farms for rapidly and mechanically removing the ear of corn from the husk, after shredding the husk and removing the butt from the husk, and shredding the husk so as to make it marketable for packing and padding purposes.

One feature of the invention relates to the means for gripping and carrying an unhusked ear of corn through the machine in such a position as to permit the husk to be ripped open and the ear of corn removed therefrom, and also to retain the husk in position to be shredded and permit the shredded portion to be cut off from the butt. This is accomplished by means of a plurality of toothed jaws or clamping members mounted on an endless chain which simultaneously carries the unhusked ear through the operations and biting through the ear near the butt to permit it to be removed therefrom, at the same time retaining a grip upon the husk.

Another feature of the invention relates to the means for opening the husk without damaging the grains of corn, whereby the ear may be readily removed therefrom. This is accomplished by means of a plurality of curved teeth mounted on an endless chain actuated longitudinally of the husk.

Another feature of the invention consists in the means for breaking the ear off of the butt at the point where the toothed jaws bite into it, which means consists in an angularly disposed guide which is engaged by the corn during its movement, causing it to be bent downwardly and broken off.

Another feature of the invention consists in the means for knocking the ear of corn out of the husk, after it has been opened up, which means consists of a revolving arm adapted to strike the ear of corn adjacent the butt, and by the force of the blow knock the corn loose from the butt and the husk so that it will fall into a suitable container.

Still another feature of the combination is the means for engaging and shredding the husk after the ear has been removed, whereby the fibers are engaged and ripped longitudinally into many shreds. This is accomplished by means of a revolving wheel having a plurality of curved teeth thereon, on which there are points adapted to pass through the husk, engaging therein and ripping it into shreds.

Still another feature of the invention consists of the means for cutting the shredded husk from the butt, which consists of a knife in position to engage and cut through the husk near the butt thereof, whereby the husk will then drop to the bottom of the machine in a great number of shreds.

Still another feature of the invention is the means employed for removing the butt of the corn from the clamping jaws and discharging it then from the machine.

This invention is directed toward shredding the corn husks and preserving the shreds thereof, so that they may be sold at a profit and used for packing, stuffing and padding upholstery, since when the shreds dry, they become curly, tough and resilient and form a valuable commercial product.

The full nature of the invention will be understood from the accompanying drawings and the following description and claims.

In the drawings, Fig. 1 is a side elevation of the machine. Fig. 2 is a plan view looking down on the machine. Fig. 3 is an end elevation. Fig. 4 is a perspective view of a portion of the endless chain guide, with clamping jaws mounted thereon.

In the drawings there is shown a machine mounted on the frame 10 supported by the legs 11. Mounted on the cross bars of the frame there are bearings 12 through which a central driving shaft 13 extends having a pulley 14 mounted on one end thereof, and arranged to be driven by a belt from any suitable source of power. Keyed to the shaft 13 there is a driving gear 15 adapted to mesh with the gear 16 keyed to the shaft 17 which is mounted in the bearings 18. Keyed on the shaft 17 there is a sprocket wheel 19 which drives an endless chain 20 for ripping open the husk, said chain being supported at one end by the idler sprocket 21 mounted in the bearing 22. Keyed on the shaft 13 there is a worm 23 adapted to mesh with a driving worm gear 24, which is secured to one end of the shaft 25 mounted in the bearings 26 supported by said frame. Keyed to the shaft 25 there is a sprocket wheel 27 which drives an endless chain 28 about an adjustable idler sprocket 29 and an end idler sprocket 30. Also keyed upon the shaft 13 there is a beveled gear 31 adapted to mesh with the beveled gear 32 mounted on one end of the shaft 33 and supported by the bearings 34. Mounted on the end of the shaft 13 opposite the pulley 14 there is a shredding wheel 35, which is revolved by said shaft and pulley. The foregoing constitutes the driving mechanism of the machine by means of which all operating parts are directly driven from the pulley wheel 14.

The endless chain 28 is comprised of a plurality of links 35 upon each of which is fixedly secured a jaw member consisting of an upright 36 extending perpendicularly to each link and arranged in pairs, whereby every other link will have a jaw member provided with a plurality of teeth 37 extending in one direction and at an angle, and the intermediate links will have their jaw members provided with teeth extending in the opposite direction. This provides an operative jaw mounted on each pair of links, which jaw opens as the chain passes around the gear, and closes when the chain straightens out, as shown in Fig. 1. The jaw teeth 37 on one upright are arranged to extend between the teeth of the other upright forming a member on the jaw and extending at an angle to each other, as shown in Fig. 2. By means of this construction as the chain passes around the gears, the jaws open so as to permit the butt of the corn 38 to be inserted between them, as shown in Fig. 1, and clamped tightly in the jaw as the chain leaves the sprocket wheel. The unhusked ear of corn is thus engaged and held by the jaws in a perpendicular position thereto, or extends inwardly parallel of the machine, as shown in Figs. 1 and 2. The chain and jaws carry the corn slowly along the operating portion of the machine, and as the corn passes over the chain 20, which is revolving in the direction indicated by the arrow, the teeth 39, which are rigidly mounted upon said chain, engage in the husk of the corn near the butt of the under side and rip it longitudinally, thereby opening the husk for permitting the ear to be ultimately removed. After this operation, the corn passes under the engaging bar 40, disposed at an angle, as shown in Figs. 1 and 2, and carried by the support 41. The bar 40 engages the tip end of the corn and forces it downwardly; whereas, the jaws hold the butt rigidly. As the teeth 37 have bitten through the butt of the corn, the ear is broken from the butt by this downward bending, at the place where the teeth have bitten in. The corn after being broken is carried along supported in the husk, and upon approaching the wheel 35, the arm 42, mounted on said wheel, strikes a blow near the butt of the corn, during its revolution and knocks the ear free from the butt and out of the husk through the slit and opening caused by the teeth 39. The freed ear of corn then drops down into a proper receptacle under the machine completely freed of the husk and butt, which is still retained clamped in the jaws.

The jaws carry the husk, after the corn has been removed, further along the machine where it is first engaged by the ripping teeth 43 which extend laterally from the wheel 35, and then by the teeth 44, and lastly by the teeth 45. The arrangement of these teeth is such that their points are curved, as shown in Fig. 3, and are very sharp, although the edges of the teeth are dull and rounded. This causes the points to pierce the husk and by the continued movement of the teeth, to rip the husk longitudinally of its fiber. The teeth 44 are mounted at close intervals on each side of the wheel 35; whereas, the teeth 43 and 45 are arranged at greater intervals and extend out from the wheel so as to engage and rip any part of the husk which may be spread laterally from the butt thereof. The comparatively rapid revolution of this shredding wheel, and the slow movement of the husk, causes the entire surface thereof to be engaged and ripped by the teeth in such a manner that the shreds are mere threads after passing through the shredding action.

The shredded husk is carried further along by the jaws until the shreds are cut off of the butt portion of the husk by the revolving knife 46 mounted on the wheel 35. The knife 46 engages the husk on the cutting plate 47 in a scissors-like manner, and the shreds of husk then drop down into a suitable container.

The butt of the corn still remains fixed in the jaws, as shown by the dotted lines 48, until the jaws pass over the sprocket 27 when they open up and the revolving arms 49 knock them free from the jaws into a suitable container.

The above description, construction and operation of the machine illustrates one means of obtaining the desired results and embodies the principles of this invention, which are to open the husk without bruising or damaging the grains of the corn, biting into the butt, so as to hold the husk in a given position, breaking off the corn from the butt and shucking it, shredding the husk for making it marketable while supported by the butt, cutting the shredded husk from the butt, and removing the butt from the machine, as will be hereafter claimed.

The invention claimed is:

1. In a corn husking and shredding machine, the combination of means for removing the corn ear from the husk with a plurality of shredding members adapted to engage and rip the corn husks into a plurality of shreds after the corn ear is removed, and means for gripping the butt end of said corn husks and carrying them in fixed position with the corn ear removed to be engaged and shredded by said shredding members.

2. In a corn husking and shredding machine, the combination of means for removing the corn ear from the husk with a plurality of shredding members adapted to engage and rip the corn husks into a plurality of shreds after the corn ear is removed, means for gripping the butt end of each individual corn husk and carrying it in fixed position with the corn ear removed, to be engaged and shredded by said shredding members, and means for cutting the shredded portion of said husks from the gripped portion thereof.

3. In a corn husking and shredding machine, the combination of means for gripping the butt end of the unhusked ears with means for carrying said gripping means and causing a continued movement thereof, a wheel mounted in said machine adjacent said carrying means, means for rotating said wheel, means mounted on said wheel for engaging and ripping said husks into shreds as they are carried past said wheel by said gripping means, and a cutting knife mounted on said wheel in position to cut the shreds of said husks from the butt thereof after they have passed through said shredding means.

4. In a corn husking and shredding machine, the combination of means for gripping the butt end of the unhusked ears with means for carrying said gripping means and causing a continued movement thereof, a wheel mounted in said machine adjacent said carrying means, means for rotating said wheel, a plurality of sharply pointed teeth mounted about the periphery of said wheel in position to pierce and rip said husks into shreds as they are moved past said wheel, and a knife mounted thereon in position to cut the shreds of said husks from the butt thereof after they have been shredded by said teeth.

5. A machine of the class described, including a plurality of gripping members adapted to clamp and hold the butt end of an unhusked ear of corn, means for causing a continued movement of said members, means for opening the husks of said corn, means for biting through the butt thereof so that said butt will remain gripped by said gripping members, and means for breaking the ear of corn from the butt and discharging it through the opening in the husk, whereby the ear of corn will be separated therefrom.

6. A machine of the class described, including a plurality of gripping members adapted to clamp and hold the butt end of an unhusked ear of corn, means for causing a continued movement of said members, a plurality of sharply pointed teeth, means for carrying said teeth and moving them longitudinally of the husk of said corn ear and adjacent thereto, whereby they will engage and rip an opening therein, means for biting through the butt thereof, and automatically operated means for breaking the ear of corn from the butt and discharging it through the opening in the husk, whereby the ear of corn will be separated therefrom.

7. A machine of the class described, including a plurality of gripping members adapted to clamp and hold the butt end of an unhusked ear of corn, means for causing a continued movement of said members, means for opening the husks of said corn, means for biting through the butt thereof, means for engaging and breaking the ear of corn from the butt at the point where it is bitten through, and means for striking the ear of corn adjacent the butt for knocking it out of said husk through the opening made therein.

8. A machine of the class described, including a plurality of gripping members adapted to clamp and hold the butt end of an unhusked ear of corn, means for causing a continued movement of said members, means for opening the husks of said corn ear, a plurality of intercepting teeth on said gripping members adapted to be forced through the butt end of said corn so as to bite it off and retain the husk, and means for breaking the ear of corn from the butt and discharging it through the opening in the husk, whereby the ear of corn will be separated therefrom.

9. In a machine of the class described, including an endless chain, means for driving said chain, a jaw member mounted rigidly upon the links of said chain, and a plurality of intercepting teeth on each pair of jaw members, whereby the paws formed by each pair of members will open as said chain is curved and will close as said chain straightens out for gripping and biting through the butt end of an unhusked ear of corn.

10. In a corn husking machine, the combination of a carrying member, including an endless chain, means for driving said chain, with a jaw member mounted rigidly upon the links of said chain, and a plurality of intercepting teeth on each pair of jaw members, whereby the jaws formed by each pair of members will open as said chain is curved and will close as said chain straightens out for gripping and biting through the butt end of an unhusked ear of corn, and means adjacent said chain for removing the ear of corn from the butt and husk, the husk being retained by said teeth.

11. In a corn husking machine, the combination of an endless carrying chain, and means for driving said chain with a plurality of gripping jaws mounted on said chain having intercepting teeth adapted to bite through the butt end of an unhusked ear of corn when placed therein, an endless ripping chain mounted horizontally and at right angles to said carrying chain, means for driving said ripping chain, a plurality of teeth mounted thereon arranged so as to engage in the husk of an ear of corn when carried by said jaws and rip an opening therein, means for breaking the ear of corn from the butt thereof, and a moving arm adapted to strike the ear of corn adjacent the butt and knock it out of said husk through the opening made therein.

12. In a corn husking and shredding machine, the combination of means for gripping and carrying an unhusked ear of corn therethrough adjacent the butt end thereof with means for biting through said butt, means for ripping an opening in the husk of said corn, means for breaking said corn from the butt at a point where it is bitten through and causing it to be discharged through the opening made in said husk, means for engaging and ripping said husk into shreds after said corn has been removed, and means for cutting said shreds from the butt end of said husk, whereby said ear of corn will be husked, the husk shredded and removed from the butt thereof.

13. In a corn husking and shredding machine, the combination of an endless chain driven thereby for carrying unhusked ears of corn therethrough with a jaw member mounted on the links of said chain having a plurality of intercepting teeth so arranged that each pair of jaw members will form a jaw adapted to open to permit the insertion of the butt end of an ear of corn and to close thereon, causing said teeth to bite therethrough, means for ripping an opening in the husk of said corn, means for breaking said corn from the butt at the point where it is bitten through and causing it to be discharged through the opening made in said husk, means for engaging and ripping said husk into shreds after said corn has been removed, and means for cutting said shreds from the butt end of said husk, whereby said ear of corn will be husked, the husk shredded and removed from the butt thereof.

14. In a corn husking and shredding machine, the combination of means for gripping and carrying an unhusked ear of corn therethrough adjacent the butt end thereof with means for biting through said butt, an endless chain adapted to travel horizontally and at right angles to said carrying chain and longitudinally of the ear of corn, means for driving said chain, a plurality of pointed teeth secured thereon, said chain and teeth being so arranged as to pass adjacent the husk of said corn so as to engage said husk near the butt end thereof and rip it longitudinally so as to form an opening therein, means for breaking said corn from the butt at the point where it is bitten through and causing it to be discharged through the opening made in said husk, means for engaging and ripping said husk into shreds after said corn has been removed, and means for cutting said shreds from the butt end of said husk, whereby said ear of corn will be husked, the husk shredded and removed from the butt thereof.

15. In a corn husking and shredding machine, the combination of means for gripping and carrying an unhusked ear of corn therethrough adjacent the butt end thereof, means for biting through said butt with means for ripping an opening in the husk of said corn, an angularly disposed bar arranged to engage the free end of the ear of corn and cause it to be bent downwardly and broken from the butt during its passage through the machine, a striking member adapted to strike the ear adjacent the butt and knock it from said husk through the opening made therein, means for engaging and ripping said husk into shreds after said corn has been removed, and means for cutting said shreds from the butt end of said husk, whereby said ear of corn will be husked, the husk shredded and removed from the butt thereof.

16. In a corn husking and shredding machine, the combination of means for gripping and carrying an unhusked ear of corn therethrough adjacent the butt end thereof with means for biting through said butt, means for ripping an opening in the husk of said corn, means for breaking said corn from the butt at the point where it is bitten through and causing it to be discharged through the opening made in said husk, a revolving wheel, a plurality of pointed and curved ripping teeth mounted on said wheel, said teeth being adapted to pierce the husk of said corn and rip it longitudinally into shreds, and a knife arranged to cut the shreds from the butt portion of said husk.

17. In a corn husking and shredding machine, the combination of means for gripping and carrying an unhusked ear of corn therethrough adjacent the butt end thereof with means for biting through said butt, means for ripping an opening in the husk of said corn, means for breaking said corn from the butt at the point where it is bitten through and causing it to be discharged through the opening made in said husk, means for engaging and ripping said husk into shreds after said corn has been removed, means for cutting said shreds from the butt end of said husk, whereby said ear of corn will be husked, the husk shredded and removed from the butt thereof, and means driven by said machine for engaging the butt and removing it from said gripping members.

18. In a corn husking and shredding machine, the combination of a frame with an endless chain mounted on said frame for engaging and carrying an unhusked ear of corn therethrough, means for removing the corn ear from the husk, a driving shaft mounted on said frame, a power driven pulley rigidly mounted on said shaft, a wheel rigidly mounted on said shaft, and a plurality of claw-like pointed teeth secured about the periphery of said wheel in position to pierce and rip said husk into shreds.

19. In a corn husking and shredding machine, the combination of a frame with means on said frame for supporting and carrying an unhusked ear of corn, a driving shaft for driving said carrying means, a power driven pulley mounted on said shaft, a gear keyed to said shaft, a second shaft, a gear keyed on said second shaft adapted to mesh with said first mentioned gear, bearings on said frame for supporting said shaft, a sprocket keyed on said second mentioned shaft, an endless chain driven by said sprocket, and a plurality of teeth secured on said chain in position to pierce the husk of said corn ear near the butt thereof and rip it longitudinally for making an opening therein, whereby the ear of said corn may be removed from said husk.

20. In a corn husking and shredding machine, the combination of means for carrying an unhusked ear of corn therethrough with means for opening the husk of said corn ear, means for breaking said corn from the butt and causing it to be removed from said husk, means for engaging and ripping said husk into shreds after said corn has been removed, and means for cutting said shreds from the butt end of said husk, whereby said ear of corn will be husked, the husk shredded and removed from the butt thereof.

21. In a corn husking and shredding machine, the combination of a ripping and shredding member mounted in said machine with means for removing the corn ear from the husk, and means for carrying and presenting each individual corn husk with the ear removed to said ripping and shredding member, whereby said corn husks will be held in such position relative thereto as to be ripped and shredded longitudinally of its fibers.

In witness whereof, I have hereunto affixed my signature.

GEORGE A. LOWRY.